United States Patent Office 3,051,680
Patented Aug. 28, 1962

3,051,680
PROCESS FOR VULCANIZING A BLEND OF A HALOGENATED ISOOLEFIN-DIOLEFIN COPOLYMER AND AN ISOOLEFIN-VINYL-AROMATIC COPOLYMER WITH FERRIC AND ZINC CHLORIDES AND PRODUCT OBTAINED
Leon S. Minckler, Jr., Metuchen, and Delmer L. Cottle, Highland Park, N.J., assignors to Esso Research and Engineering Company, a corporation of Delaware
No Drawing.  Filed Mar. 10, 1958, Ser. No. 720,088
13 Claims.  (Cl. 260—41.5)

This invention relates to the vulcanization of blends of halogenated butyl rubber in the presence of minor proportions of copolymers of compounds containing at least one cyclic nucleus and a $C_4$ to $C_{10}$ olefinic material.

It is desirable in the bead and tread areas of tires to have rubbery compositions which exhibit a combination of high modulus and high tensile strength as well as high abrasion resistance and resistance to deteriorating influences such as chemicals and heat.

It has now been discovered that the above advantages are obtained if halogenated butyl rubber is cured in the presence of certain copolymers of vinyl aromatic hydrocarbons and $C_4$ to $C_{10}$ olefins.

In practicing the present invention, about 100 parts by weight of halogenated butyl rubber are compounded with about 1 to 80, advantageously about 3 to 60, and preferably about 5 to 40 parts by weight of a copolymer of a vinyl aromatic hydrocarbon and an isoolefin and also preferably additionally compounded with about 20 to 100 parts by weight of a filler such as a clay, $TiO_2$, or especially a carbon black. There may also be added about 0.2 to 5.0 parts by weight of an anti-tack agent such as stearic acid or zinc stearate, with or without about 0.1 to 3.0 parts by weight of an antioxidant such as phenyl-beta-naphthylamine. The resulting composition may then be vulcanized in the presence of added curatives for 1 minute to 10 days, preferably for 5 minutes to 5 days at about 50° to 450° F., advantageously at about 60° to 400° F., and preferably at about 70° to 350° F. whereby there is produced a vulcanizate of high modulus and tensile strength which exhibits high resistance to chemicals and abrasion.

In producing halogenated butyl rubber to be vulcanized in accordance with the present invention, unmodified, unvulcanized butyl rubber having a molecular weight (Staudinger) of at least 20,000, and an iodine number (Wijs) of about 1–50, and made according to Patent 2,356,128, is carefully halogenated until it contains about at least 0.5 weight percent (preferably at least about 1.0 weight percent), but not more than about "X" weight percent of combined chlorine or 3 "X" weight percent combined bromine wherein:

$$X = \frac{M_3 L}{(100-L)M_1 + L(M_2+M_3)} \times 100$$

and:

L=mole percent of the multiolefin in the polymer
$M_1$=molecular weight of the isoolefin
$M_2$=molecular weight of the multiolefin
$M_3$=atomic weight of the halogen Restated, there should be at least about 0.5 weight percent of combined halogen in the polymer but not more than about one atom of chlorine or 3 atoms of bromine combined in the polymer per molecule of multiolefin present therein; i.e., per double bond in the polymer.

Suitable halogenating agents which may be employed are gaseous chlorine, liquid bromine, alkali metal hypochlorites, or hypobromites, sulfur chlorides or bromides (particularly oxygenated sulfur chlorides or bromides), pyridinium chloride perchloride, N-bromo-succinimide, iodine monochloride, alpha-chloroacetoacetanilide, tri-bromophenol bromide, N-chloroacetamide, N-bromophthalimide, N,N'-dimethyl-5,5 dichloro or dibromo hydantoin, and other common halogenating agents.

The halogenation is generally conducted at about 0° to about +200° C., advantageously at about 0° to 165° C., preferably at about 20° to 60° C. (room temperature being generally satisfactory), depending upon the particular halogenation agent, for about one minute to several hours. An advantageous pressure range is from about 0.5 to 400 p.s.i.a.; atmospheric pressure being satisfactory. The halogenation conditions are regulated to halogenate the rubbery copolymer to the extent abovementioned.

The halogenation may be accomplished in various ways. For example, the solid rubbery copolymer may be halogenated per se. Another process comprises preparing a solution of the copolymer as above, in a suitable inert liquid organic solvent such as a $C_3$ to $C_{10}$, or preferably, a $C_5$ to $C_8$, inert hydrocarbon or halogenated derivatives of saturated hydrocarbons, examples of which are hexane, heptane, naphtha, mineral spirits, cyclohexane, alkyl substituted cycloparaffins, benzene, chlorobenzene, chloroform, trichloroethane, carbon tetrachloride, mixtures thereof, etc. and adding thereto gaseous chlorine, liquid bromine, or other halogenating agent, which may optionally be in solution, such as dissolved in any inert hydrocarbon, an alkyl chloride, carbon tetrachloride, etc.

The concentration of the butyl rubber in the solvent will depend upon the type of reactor, molecular weight of the butyl rubber, etc. In general, the concentration of a butyl rubber having a viscosity average molecular weight of about 200,000 to about 1,500,000, if the solvent is a substantially inert hydrocarbon, will be between 1 and 30% by weight, preferably about 5 to 20%. If chlorine gas is employed to chlorinate such a rubbery solution, it may also be diluted with up to about 50 times its volume, preferably about 0.1 to 5.0 times its volume of an inert gas such as nitrogen, methane, ethane, carbon dioxide, etc.

The resulting halogenated butyl rubber polymer may be recovered in various manners. The polymer may be precipitated with acetone, or any other known nonsolvent for the butyl rubber, and dried under about 1 to 760 millimeters or higher of mercury pressure absolute at about 0° to 180° C., preferably at about 50 to 150° C. (e.g., 70° C.). Other methods of recovering the halogenated butyl rubber polymer from the hydrocarbon solution of the same area by conventional spray or drum drying techniques. Alternatively, the halogenated butyl rubber-containing solution may be injected into a vessel containing agitated water heated to a temperature sufficient to flash off the hydrocarbon solvent and form an aqueous slurry of the halogenated butyl rubber. The halogenated butyl rubber may then be separated from this slurry by filtration, dried and recovered as a "crumb" or as a dense sheet or slab by conventional milling and/or extruding procedures. The halogenated copolymer formed advantageously has a viscosity average molecular weight between about 200,000 and 1,500,000 and a mole percent unsaturation of between about 0.5 and 15.0, preferably about 0.6 to 5.0.

A representative type of copolymer which is advantageously present during the vulcanization of halogenated butyl rubber, in accordance with the present invention, is one made by copolymerizing about 30 to 70, preferably about 40 to 60, weight percent of a compound containing at least one cyclic nucleus and especially a vinyl aromatic hydrocarbon such as styrene with about 30 to 70, preferably 60 to 40, weight percent of a $C_4$ to $C_8$ olefin and especially a $C_4$ to $C_7$ isoolefin such as isobutylene. In preparing such a copolymer, the mono-olefinic compound containing a cyclic nucleus (e.g., styrene) and an alkene of about 4 to 6 carbon atoms (e.g., isobutylene) are copolymerized in the presence of a lower alkyl halide diluent such as methyl chloride or a saturated hydrocarbon, carbon disulfide, refined naphtha, mineral spirits, etc. at a temperature below 0° F. (e.g., −10° to −250° F.) and preferably about −50° to −200° F. with a Friedel-Crafts catalyst such as aluminum chloride. The catalyst is also preferably dissolved in an alkyl halide such as methyl chloride. The process may be carried out either batchwise or preferably continuously, and the resulting copolymer may be recovered by any desired means. One suitable method is to inject the cold reaction mixture consisting of polymer dissolved in the inert diluent, together with unreacted raw materials (if any) and residual catalyst (if any) into hot water with or without an added alcohol such as isopropyl alcohol in order to flash off volatile solvent and inactivate residual catalyst. By means of the above, it is also possible to produce a slurry of fine polymer solid particles suspended in water. The resulting solid polymer may range from a viscous fluid or a relatively stiff plastic mass to a hard or tough, thermoplastic resinous solid, depending chiefly upon the type and concentration of the catalyst, proportion of cyclic compound in the feed, temperature of polymerization, polymer yield, etc. Preferably, it has an intrinsic viscosity of above 0.5 (e.g., about 0.6 to 3.0).

Various equivalent materials may be used. For instance, instead of styrene, one may use any of the above-listed vinyl aromatics and also p-ethyl styrene, various ethyl or other lower alkyl homologues of styrene, various ring-halogenated styrene homologues, or other cyclic materials which also polymerize in similar manner with isobutylene. Such latter materials include vinyl naphthalene, indene, dihydronaphthalene, etc. Instead of isobutylene, one may use other lower olefins, preferably iso-olefins such as 2-methyl-butene-1, 3-methyl-butene-1, etc. The lower normal olefins do not polymerize quite as readily by the low temperature Friedel-Crafts technique, but may be used, if desired, particularly with higher catalyst concentrations. Although methyl chloride is the preferred lower alkyl halide for use as diluent-solvent, one may also use ethyl chloride, propyl chloride, certain of the low boiling fluorides, paraffins, naphtha, etc. As the catalyst, the preferred material is aluminum chloride dissolved in methyl chloride, but one may also use metal-alkyl type catalysts or boron fluoride or other active Friedel-Crafts catalyst, either alone or dissolved in a suitable solvent. U.S. Patent 2,274,749 describes copolymers of the general type referred to above, i.e., copolymers of $C_3$-$C_8$ iso-olefins, preferably $C_4$-$C_7$ iso-olefins (e.g., $C_3$-$C_7$ iso-olefins or $C_3$ or $C_4$ to $C_5$ iso-olefins such as isobutylene) and a vinyl-aromatic (such as styrene) and methods of preparing the same, to which the present invention is applicable.

In order to more fully illustrate the present invention, the following experimental data are given. In all examples, the halogenated butyl rubber was a chlorinated butyl rubber having a Mooney viscosity (212° F. for 8 minutes) of 65, a mole percent unsaturation of 0.9, a viscosity average molecular weight of 475,000, and a combined chlorine content of 1.1 weight percent. The added isoolefin-vinyl aromatic copolymer, in all instances, was a copolymer having an intrinsic viscosity of 1.0, and containing 50 weight percent of isobutylene and 50 weight percent of styrene. The compounding and results were as follows:

EXAMPLE I

| Component | Parts by weight |
|---|---|
| Chlorinated butyl rubber | 80 |
| Added copolymer | 20 |
| MPC carbon black | 50 |
| Zinc stearate | 1.0 |
| Curative: | |
| Run (A) zinc oxide | 5.0 |
| Run (B) ferric chloride | 1.0 |

| | Run A | Run B |
|---|---|---|
| Cured 5 mins. at 307° F.: | | |
| Modulus, p.s.i./300% | 640 | 565 |
| Tensile strength, p.s.i. | 1,185 | 1,570 |
| Elongation, percent | 610 | 615 |
| Cured 15 mins. at 307° F.: | | |
| Modulus, p.s.i./300% | 775 | 655 |
| Tensile strength, p.s.i. | 1,570 | 1,540 |
| Elongation, percent | 550 | 590 |
| Cured 30 mins. at 307° F.: | | |
| Modulus, p.s.i./300% | 940 | 720 |
| Tensile strength, p.s.i. | 1,700 | 1,760 |
| Elongation, percent | 460 | 555 |

The above data show that chlorinated butyl rubber may be effectively cured by either zinc oxide or ferric chloride in the presence of an isoolefin-vinyl aromatic copolymer. It will be noted that the ferric chloride cure is the fastest producing a vulcanizate in 5 minutes comparable to a zinc oxide cured vulcanizate cured for 15 minutes. A control cured at 307° F. for 30 minutes by ferric chloride but containing no added isoolefin-vinyl aromatic copolymer showed a modulus of only 310 p.s.i., a tensile strength of only 925 p.s.i. and an elongation of 645%.

EXAMPLE II

The same general procedure as in Example I was repeated both with and without 5 to 20 weight percent of added isoolefin-vinyl aromatic copolymer (of 50 weight percent each of isobutylene and styrene) except that during compounding, 0.2 part by weight of phenyl-beta-naphthylamine per 100 parts by weight of chlorinated butyl rubber copolymer was added as an antioxidant. The results were as given in Table I, in all instances the curative being 5 weight percent based on rubber copolymer of zinc chloride:

*Table I*

| Cure conditions | | All chlorinated butyl rubber | | | Chlorinated butyl rubber + 20% copolymer | | | Chlorinated butyl rubber + 5% added copolymer | | |
|---|---|---|---|---|---|---|---|---|---|---|
| Temp. (° F.) | Time (minutes) | 300% modulus (p.s.i.) | Tensile (p.s.i.) | Elong. (Percent) | 300% modulus (p.s.i.) | Tensile (p.s.i.) | Elong. (Percent) | 300% modulus (p.s.i.) | Tensile (p.s.i.) | Elong. (Percent) |
| 250 | 5 | 295 | 785 | 705 | 420 | 1,080 | 640 | 690 | 1,140 | 500 |
| 250 | 15 | 280 | 615 | 645 | 480 | 1,120 | 600 | 610 | 1,105 | 535 |
| 225 | 15 | 375 | 830 | 590 | 600 | 1,270 | 605 | (¹) | (¹) | (¹) |
| 200 | 5 | 245 | 645 | 740 | 445 | 1,275 | 680 | 635 | 1,290 | 515 |
| 200 | 15 | 335 | 805 | 610 | 445 | 1,200 | 620 | 725 | 1,305 | 490 |
| 75 | ² 4 | 200 | 665 | 665 | 520 | 1,335 | 540 | (¹) | (¹) | (¹) |

¹ Not tested.  ² Days.

The data in Table I show that both the 300% modulus and the tensile strength are better for chlorinated butyl rubber vulcanizates containing added "copolymer" (i.e., an isoolefin-vinyl aromatic copolymer) compared to vulcanizates containing no added copolymer.

EXAMPLE III

The same general procedure as in Example I was repeated both with and without 20 weight percent of added isoolefin-vinyl aromatic copolymer and using in all instances as the curative a combination of 2.5 parts by weight of zinc chloride and 2.5 parts by weight of zinc oxide per 100 parts by weight of chlorinated butyl rubber. The results were as follows:

*Table II*

| Cure conditions | | All chlorinated butyl rubber | | | 80 weight percent of chlorinated butyl rubber plus 20 weight percent added copolymer | | |
|---|---|---|---|---|---|---|---|
| Temp. (° F.) | Time (minutes) | 300% modulus (p.s.i.) | Tensile (p.s.i.) | Elong. (percent) | 300% modulus (p.s.i.) | Tensile (p.s.i.) | Elong. (percent) |
| 200 | 5 | (1) | (1) | (1) | 420 | 1,370 | 685 |
| 250 | 30 | 445 | 1,200 | 920 | 1,130 | 2,125 | 500 |
| 307 | 30 | 790 | 1,735 | 460 | 1,220 | 2,135 | 415 |

1 Not tested.

The data in Table II show that the 300% modulus and the tensile strength are higher for a chlorinated butyl rubber vulcanizate containing an added isoolefin-vinyl aromatic copolymer compared to a vulcanizate containing no added copolymer.

EXAMPLE IV

The same general procedure as in Example I was repeated both with and without 20 weight percent of added isoolefin-vinyl aromatic copolymer (i.e., 50—50 isobutylene-styrene copolymer) and using in all instances as the curatives a combination of 5 parts by weight of zinc chloride and 5 parts by weight of magnesium oxide per 100 parts by weight of chlorinated butyl rubber. The results were as follows:

*Table III*

| Cure conditions | | All chlorinated butyl rubber | | | 80 weight percent of chlorinated butyl rubber plus 20 weight percent added copolymer | | |
|---|---|---|---|---|---|---|---|
| Temp. (° F.) | Time (minutes) | 300+ modulus (p.s.i.) | Tensile (p.s.i.) | Elong. (percent) | 300+ modulus (p.s.i.) | Tensile (p.s.i.) | Elong. (percent) |
| 200 | 5 | (1) | (1) | (1) | 1,325 | 2,270 | 440 |
| 250 | 30 | 315 | 920 | 665 | 2,020 | 2,475 | 510 |
| 307 | 30 | 485 | 1,035 | 530 | 2,060 | 2,060 | 300 |

1 Not tested.

The same general comments apply as in Example III.

EXAMPLE V

The same general procedure as in Example I was repeated using as the curative 5 parts by weight per 100 parts by weight of rubber of stannous chloride with the following results:

*Table IV*

| Cure conditions | | 80 weight percent of chlorinated butyl rubber plus 20 weight percent added copolymer | | |
|---|---|---|---|---|
| Temp. (° F.) | Time (minutes) | 300+ modulus (p.s.i.) | Tensile (p.s.i.) | Elongation (percent) |
| 200 | 5 | 460 | 1,640 | 760 |
| 225 | 30 | 665 | 1,775 | 620 |

The data in Table IV show that chlorinated butyl rubber may be effectively cured by stannous chloride in the presence of an isoolefin-vinyl aromatic copolymer.

EXAMPLE VI

The same general procedure as in Example I was repeated using as curatives for chlorinated butyl rubber-isobutylene-styrene copolymer blends, the following shown in Table V.

*Table V*

| Cure conditions | Curatives in parts by weight | | | | | | | | |
|---|---|---|---|---|---|---|---|---|---|
| | Zinc oxide, 5.0; tetramethyl thiuram disulfide, 2.0 | | | Zinc oxide, 5.0; sulfur, 1.0; tetramethyl thiuram disulfide, 2.0 | | | Zinc oxide, 5.0; sulfur, 1.0; tellurium diethyl dithiocarbamate, 2.0 | | |
| | 300% modulus (p.s.i.) | Tensile (p.s.i.) | Elong. (percent) | 300% modulus (p.s.i.) | Tensile (p.s.i.) | Elong. (percent) | 300% modulus (p.s.i.) | Tensile (p.s.i.) | Elong. (percent) |
| 15 mins. at 307° F | 1,150 | 2,775 | 565 | 1,430 | 3,065 | 545 | 1,250 | 2,915 | 565 |
| 60 mins. at 307° F | 1,645 | 2,955 | 475 | 1,710 | 3,185 | 505 | 1,645 | 2,710 | 460 |

The above data show that a variety of curing agents and curing conditions vulcanize blends of chlorinated butyl rubber and isoolefin-vinyl aromatic copolymers into vulcanizates of high modulus and high tensile strength.

Resort may be had to modifications and variations of the disclosed embodiments without departing from the spirit of the invention or the scope of the appended claims.

What is claimed is:

1. A vulcanized composition comprising a major proportion of a halogenated isobutylene-diolefin butyl rubber copolymer, a minor proportion of a copolymer of about 30 to 70% of a $C_4$ to $C_{10}$ olefin with about 30 to 70% of a compound containing at least one cyclic nucleus, said composition being selected from the group consisting of styrene, alkyl ring substituted styrenes, halo-ring substituted styrenes and mixtures thereof, and about 0.5 to 30.0 weight percent based on halogenated copolymer of a metal chloride selected from the group consisting of ferric chloride and zinc chloride.

2. A composition according to claim 1 containing per 100 parts by weight of halogenated butyl rubber copolymer about 3 to 60 parts by weight of added copolymer.

3. A composition according to claim 1 in which the olefin-cyclic nucleus compound containing copolymer comprises a copolymer of about 30 to 70 weight percent of styrene and about 30 to 70 weight percent of a $C_4$ to $C_7$ isoolefin.

4. A composition according to claim 1 in which the olefin-cyclic nucleus compound containing copolymer comprises about 30 to 70 weight percent of isobutylene and about 30 to 70 weight percent of styrene.

5. A composition according to claim 1 in which the halogenated butyl rubber contains at least 0.5 weight percent combined chlorine but not more than about one combined chlorine atom per double bond in the butyl rubber.

6. A composition according to claim 1 in which the halogenated butyl rubber contains at least about 0.5 weight percent combined bromine but not more than about 3 atoms of bromine combined per double bond in the butyl rubber.

7. A composition according to claim 1 containing about 1.0 to 5.0 parts by weight of the metal chloride.

8. A vulcanized composition comprising about 100 parts by weight of a halogenated isobutylene-diolefin butyl rubber copolymer, about 1 to 80 parts by weight of a copolymer of a $C_4$ to $C_{10}$ isoolefin and a compound containing a cyclic nucleus, said compound being selected from the group consisting of styrene, alkyl ring substituted styrenes, halo-ring substituted styrenes and mixtures thereof, and about 0.5 to 30.0 parts by weight of a metal chloride selected from the group consisting of ferric chloride and zinc chloride, said vulcanized composition exhibiting an extension modulus at 300% elongation of at least about 400 p.s.i. and a tensile strength above about 1,000 p.s.i.

9. A vulcanized composition according to claim 8 also containing about 20 to 100 parts by weight based on halogenated rubber of an added filler.

10. A process for vulcanizing a halogenated isobutylene-diolefin butyl rubber copolymer into a vulcanizate of increased tensile strength and extension modulus and of improved abrasion resistance and resistance to chemical deterioration comprising blending with about 100 parts by weight of said halogenated rubber, about 3 to 60 parts by weight of a copolymer of about 30 to 70 weight percent of a $C_4$ to $C_8$ isoolefin and about 30 to 70 weight percent of a compound containing a cyclic nucleus, said compound being selected from the group consisting of styrene, alkyl ring substituted styrenes, halo-ring substituted styrenes and mixtures thereof, compounding with the mixture formed about 0.5 to 20 parts by weight of a metal chloride selected from the group consisting of ferric chloride and zinc chloride, and heating the resulting mixture for about 1 minute to 10 days at a temperature level of between about 50° and 450° F. so as to covulcanize said halogenated butyl rubber and cyclic nucleus-containing copolymer.

11. A process according to claim 10 in which the compounded stock formed contains about 20 to 100 parts by weight of a filler comprising at least 1 carbon black.

12. A process according to claim 10 in which the copolymer of the isoolefin and the compound containing a cyclic nucleus comprises a copolymer of about 30 to 70 weight percent of isobutylene and about 30 to 70 weight percent of styrene.

13. A process according to claim 10 in which the vulcanizate has been heated at a temperature level of between about 70° and 350° F.

References Cited in the file of this patent

UNITED STATES PATENTS

| | | |
|---|---|---|
| 2,434,129 | Throdahl | Jan. 6, 1948 |
| 2,436,614 | Sparks et al. | Feb. 24, 1948 |
| 2,491,525 | Sparks et al. | Dec. 20, 1949 |
| 2,572,959 | Sparks et al. | Oct. 30, 1951 |
| 2,631,984 | Crawford et al. | Mar. 17, 1953 |
| 2,732,354 | Morrissey et al. | Jan. 24, 1956 |
| 2,811,190 | Iknayan et al. | Oct. 29, 1957 |
| 2,944,578 | Baldwin et al. | July 12, 1960 |